(12) United States Patent
Mintz et al.

(10) Patent No.: US 8,417,621 B2
(45) Date of Patent: Apr. 9, 2013

(54) MANAGING HEDGE ORDERS FOR SYNTHETIC SPREAD TRADING

(75) Inventors: Sagy Pundak Mintz, Lincolnshire, IL (US); Patricia A. Messina, Chicago, IL (US); Thomas R. Zagara, LaGrange, IL (US)

(73) Assignee: Trading Technologies International, Inc., Chicago, IL (US)

( * ) Notice: Subject to any disclaimer, the term of this patent is extended or adjusted under 35 U.S.C. 154(b) by 147 days.

(21) Appl. No.: 12/836,474

(22) Filed: Jul. 14, 2010

(65) Prior Publication Data
US 2012/0016784 A1 Jan. 19, 2012

(51) Int. Cl.
*G06Q 40/00* (2012.01)

(52) U.S. Cl.
USPC .......................................................... 705/37

(58) Field of Classification Search .................. 705/35, 705/36 R, 37
See application file for complete search history.

(56) References Cited

U.S. PATENT DOCUMENTS

| | | | |
|---|---|---|---|
| 6,772,132 B1 | 8/2004 | Kemp et al. | |
| 6,938,011 B1 | 8/2005 | Kemp et al. | |
| 7,127,424 B2 | 10/2006 | Kemp et al. | |
| 7,228,289 B2 | 6/2007 | Brumfield et al. | |
| 7,389,264 B2 | 6/2008 | Kemp et al. | |
| 7,389,268 B1 | 6/2008 | Kemp et al. | |
| 7,424,450 B2 | 9/2008 | Kemp et al. | |
| 7,437,325 B2 | 10/2008 | Kemp et al. | |
| 7,574,391 B1 | 8/2009 | Monroe et al. | |
| 7,742,976 B1 * | 6/2010 | Burns et al. | 705/37 |
| 2003/0069826 A1 * | 4/2003 | Guidi et al. | 705/37 |
| 2005/0125327 A1 | 6/2005 | Fishbain | |
| 2005/0154668 A1 | 7/2005 | Burns et al. | |
| 2010/0017321 A1 | 1/2010 | Callaway et al. | |
| 2010/0125534 A1 * | 5/2010 | Brandes et al. | 705/36 |
| 2011/0040668 A1 * | 2/2011 | Lee et al. | 705/37 |
| 2011/0040669 A1 | 2/2011 | Lee et al. | |

OTHER PUBLICATIONS

Unpublished U.S. Appl. No. 12/410,759, entitled "Systems and Methods for Multiplier-Adjusted Lean Levels for Trading Strategies," filed Mar. 25, 2009 in the name of Sagy P. Mintz et al.
Unpublished U.S. Appl. No. 12/637,517, entitled "Synthetic Spread Trading," filed Dec. 14, 2009 in the name of Sagy P. Mintz et al.
Unpublished U.S. Appl. No. 12/637,536, entitled "Cover-OCO for Legged Order," filed Dec. 14, 2009 in the name of Patrick J. Rooney.
International Search Report and Written Opinion of International Application No. PCT/US2011/040260, dated Sep. 8, 2011 (mailed Sep. 16, 2011).

* cited by examiner

*Primary Examiner* — Olabode Akintola
(74) *Attorney, Agent, or Firm* — McDonnell Boehnen Hulbert & Berghoff LLP

(57) ABSTRACT

Hedge legs for synthetic spread trading strategies are managed as attached or detached from a synthetic spread order. A legged hedge order may be changed, adjusted, deleted, cancelled or otherwise managed according to changes, adjustments, deletions ad/or cancellations of the synthetic spread order upon which the legged spread order was submitted.

19 Claims, 8 Drawing Sheets

Figure 6

| Spreader | □ ⊡ ⊠ |
|---|---|
| 10:23:32 | 518 512 |
| 506 | 33 |
| 524 | |

| | |
|---|---|
| -0.040 | |
| | 0.020 |
| | 0.015 |
| | 0.010 |
| | 0.005 |
| | 0.000 |
| | -0.005 |
| | -0.010 |
| | -0.015 |
| 0 | -0.020 |
| 1 | -0.025 |
| 5 | -0.030 |
| 10 | 20 | -0.035 | 3 |
| 50 | 100 | -0.040 | |
| CLR | -0.045 |
| 0 | -0.050 |
| | -0.055 |
| B 0 W 1 L 1 536 | -0.060 |
| | -0.065 530 |
| Del All | |
| Delete | |
| Delete 1 | |

| F Jun10 | □ ⊡ ⊠ |
|---|---|
| 10:23:32 | 520 514 |
| 508 | 2 |
| 526 | |

| | |
|---|---|
| <Default> | |
| | 1.06 |
| | 1.05 |
| | 1.04 |
| | 1.03 |
| | 1.02 |
| | 1.01 |
| 0 | 1.00 |
| | 0.99 |
| 0 | 0.98 |
| 1 | 0.97 |
| 5 | 0.96 |
| 10 | 20 | 0.95 |
| 50 | 100 | 0.94 |
| CLR | 0.93 |
| 0 | B 3 W 3 538 6 540 | 0.92 |
| SL | SM | 100 | 0.91 |
| | 100 | 0.90 |
| Limit | 0.89 |
| Del All | 532 |

| F Dec10 | □ ⊡ ⊠ |
|---|---|
| 10:23:32 | 522 516 |
| 510 | |
| 528 | |

| | |
|---|---|
| <Default> | |
| | 1.09 |
| | 1.08 |
| | 1.07 |
| 0 | 1.06 |
| 0 | S 0 W 2 540 | 1.05 6 |
| | 538 | 1.04 |
| 1 | 1.03 |
| 5 | 1.02 |
| 10 | 20 | 542 S 0 W 2 | 1.01 1 |
| 50 | 100 | | |
| CLR | 538 | 1.00 |
| 0 | 0.99 |
| SL | SM | 0.98 |
| | 0.97 |
| | 0.96 |
| Limit | 0.95 |
| Del All | 0.94 |
| | 0.93 |
| | 0.92 534 |

Figure 7

Spread Configuration

Configure This Spread

Autospreader: TTSIM-D FGBL Sep02 vs. TTSIM-D FGBL Sep02

Spread Name: _____

Slop
Inside: _____
Outside: _____

Leg Color ID: _____ ▸

Base Spread On
● Implied Spread Prices
○ Net Change

[OK] [CANCEL]

| | LEG A | | LEG B | |
|---|---|---|---|---|
| Leg | F JUN10 ▸ | | F DEC10 ▸ | |
| Customer Account | <Default> ▸ | | <Default> ▸ | |
| Active Quoting | ☒ | | ☒ | |
| Adjust for Market Depth | | | | |
| Offset with | Limit Orders ▸ | | Limit Orders ▸ | |
| Payup Ticks | 0 | | 0 | |
| Spread Ratio | 1 | | -1 | |
| Attached | ☒ | | ☒ | |
| OCO Bracket | 2 | | 4 | |
| Price Reasonability Check on leg | ☒ | | ☒ | |

MANAGING HEDGE ORDERS FOR SYNTHETIC SPREAD TRADING

TECHNICAL FIELD

The present invention relates generally to electronic trading, and particularly to managing hedge orders for synthetic spread trading.

BACKGROUND

Electronic trading systems have one or more networked computers, servers, gateways, processors, and related devices to couple a user (e.g., a trader) to one or more exchanges (also referred to as an electronic exchange, or host exchange). The exchange has one or more centralized computers for receiving, matching and processing orders from traders, other electronic trading systems and/or other exchanges for one or more tradeable objects traded, listed, and/or exchanged at the exchange. The exchange administers information for the tradeable objects and supplies, or broadcasts, the information via a real-time, or substantially real-time, streaming data feed, or other suitable form. The information generally includes at least a portion of an order book and order fill information. Traders may have one or more client devices connected to the electronic exchange for viewing the information and submitting orders.

A tradeable object includes an item or quantity of the item that can be traded, swapped of otherwise exchanged at a price, including but are not limited to, all types of traded events, goods, wares and/or financial product such as stocks, bonds, options, futures, commodities, currencies, repos, indexes, warrants, funds, derivatives thereof, collections or combinations thereof and the like. The tradeable object may be "real," (i.e., products listed by an exchange), or "synthetic" (i.e., a combination of real products).

The trader may employ one or more trading strategies for entering into trades for one or more tradeable objects. A complex trading strategy (known as a spread), includes simultaneous, or substantially simultaneous, buying and/or selling of one or more tradeable objects (also known as outright markets or legs). A spread may be exchange-defined or synthetic, where an exchange-defined spread is listed and priced as a whole, and a synthetic spread and its parameters are generally identified by the trader. Spreads may be inter- or intra-commodity and include a butterfly, bear, bull, calendar, crack, horizontal, vertical, basis, bundles, packs, strips, straddles, strangles, and ratio spreads.

A trader may use a trading tool to compile and present the information, define parameters of a spread, select a target spread price, enter orders, and re-price or requote working order, in response to changes in the inside market for the hedge to achieve the target spread. The trading tool also may send a hedge order for the hedge leg at the inside market of the hedge leg based on the trader's parameters and/or the trading strategy. If the inside market for the hedge order does not change before the hedge order is received and executed, and there is sufficient quantity available for the hedge order, the hedge order can be filled. A portion of the hedge order that exceeds the quantity available at the inside market may not be filled. In addition, if the inside market changes, the hedge order may not be filled, at least not immediately, if at all. In this instance, the trader, and the spread, is said to be legged, because at least a portion of the hedge order (i.e., leg) did not get filled.

On occasion, a trader may change or adjust a target spread price, or for a legged spread. Because the working orders, hedge orders and fills of working and hedge orders may not be reported, tracked, managed, administered or otherwise recorded as part of a spread trading strategy, the trader may need to account for the legged order. That is, the trader may need to adjust, and/or cancel/replace, the legged order to match a changed target spread price. In this instance, the trader may need to recalculate a new price for the legged order based on the new target spread price other parameters of the spread. Thus, multiple time-consuming steps and additional resources may be necessary for the trader to achieve the new target spread price.

Accordingly, tools to improve assistance for a trader to employ synthetic spread trading strategies are desirable.

SUMMARY

Managing hedge orders for synthetic spread trading may include methods, systems, and apparatuses.

In an embodiment for managing hedge orders for synthetic spread trading, a hedge order for a synthetic spread may be considered to be attached or detached to the synthetic spread from which the hedge order derived. For example, the trader of the synthetic spread may use a trading tool to set parameters for the synthetic spread, where one or more legs are identified as attached or detached to the synthetic spread. After the synthetic spread is submitted, a hedge order may be pending execution, or otherwise considered legged. An attached hedge order pending execution may be adjusted in response to adjustments to the synthetic spread order from which the pending hedge order derived. For example, a price for hedge order pending execution that derives from a synthetic spread may change in response to changes in the synthetic order while the hedge order is pending. A hedge order that is not is attached may not be affected by changes and/or adjustments to the synthetic spread order from which the pending hedge order derived.

A hedge order for a hedge leg of a synthetic spread may be detected, such as by a client device, a trading device or any other device having a processor and/or configurable to monitor and manage electronic orders. The hedge order is derived or otherwise generated based on a target price for the synthetic spread and a working order of the synthetic spread on which the hedge order is based. The hedge order may be pending execution at an electronic exchange for some or all of an original quantity of the hedge order. For example, the hedge order is for an unfilled quantity that is pending execution at an electronic exchange at a hedge price.

A price at which the synthetic spread was entered and/or submitted for trading may be changed. For example, a command to change or otherwise adjust the target price for the synthetic spread may be received. The command may be received by the client device via an input device associated with the client device. The command may be configured to initiate a change to the price for the synthetic spread to a new target price for the synthetic spread. The client device may determine a new hedge order price. The new hedge order price may be determined or otherwise calculated based on the new target price and an update message is submitted to the electronic exchange to change the hedge price to a new hedge price.

In an embodiment, the message may cancel the hedge order and replace the hedge order with a new hedge order at the new hedge price, such as by a cancel/replace order. In an alternative or additional embodiment, the message includes script for changing the hedge price of the hedge order to the new hedge price. In response to an inside market for the hedge leg being between the hedge order price and the new hedge order price, some or all of the unfilled quantity of the hedge order may be filled at that inside market.

In an embodiment, the new hedge order price is determined based on the new target price for the synthetic spread order and user parameters for the synthetic spread. The user parameters may be input and stored by the client device. The user parameters may be input before or after the synthetic spread is entered or otherwise submitted. The parameters also may include identifying the synthetic spread attached/detached, and or all or some of the legs of the synthetic spread as attached/detached.

In an embodiment, the client device includes one or more displays, such as a monitor, for displaying prices for the synthetic spread. In addition or alternatively, the display may display prices for some or all legs of the synthetic spread based on or derived from market information received from the electronic exchange for each leg. The prices for the synthetic spread may be based on or derived from market information for each leg of the synthetic spread, and also may be based on user parameters. The prices may be displayed axially aligned to form a price axis or ladder. A synthetic spread order indicator for the synthetic spread may be displayed along axially aligned prices for the synthetic spread at a price level corresponding to the hedge price. A hedge order indicator may be displayed along axially aligned prices for the hedge leg corresponding to the hedge price. The indicator may distinguish whether the hedge order is attached. The indicator also may identify a quantity associated with the hedge order.

Other embodiments of the present invention are described below. In addition, modifications may be made to the described embodiments without departing from the spirit or scope of the invention.

BRIEF DESCRIPTION OF THE FIGURES

Managing hedge orders for synthetic spread is described and illustrated via exemplary embodiments, which are not limited by the accompanying figures. Figures having like reference numerals indicate similar elements.

FIG. 6 shows a spread window display for a synthetic spread after a quoting order has been filled and child hedge orders has been legged.

FIG. 7 illustrates a spread window display for a synthetic spread after a quoting order is filled, at least one corresponding hedge order is unfilled, and a price for the synthetic spread is adjusted.

FIG. 8 illustrates an example of a Spread configuration window.

DETAILED DESCRIPTION

I. Electronic Trading Environments

Figure 1:
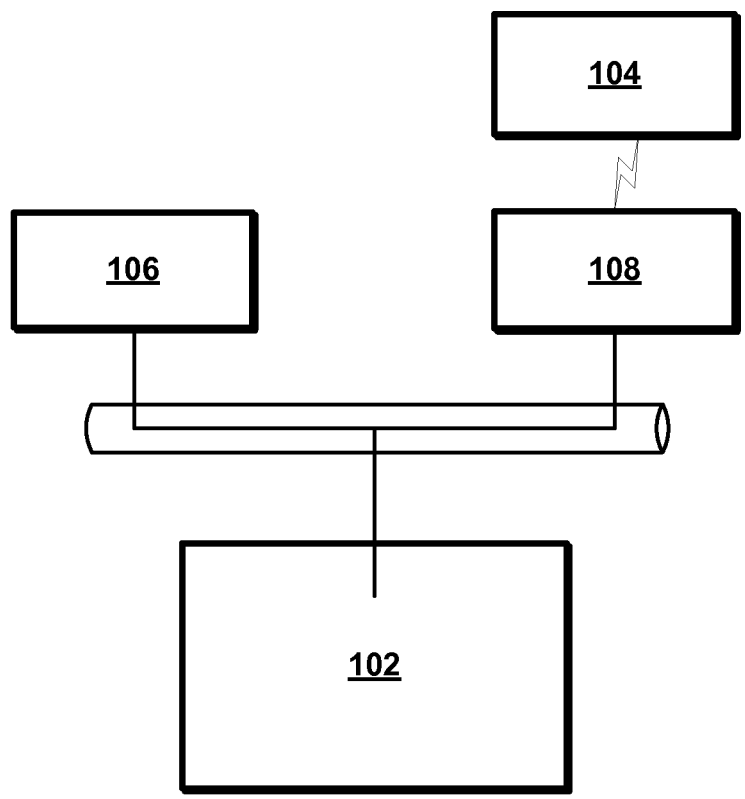
FIG. 1 illustrates an exemplary electronic trading environment for managing hedge orders for synthetic spread trading.

FIG. 1 illustrates an exemplary electronic trading environment for managing hedge orders for synthetic spread trading. The electronic trading environment includes a client device 102, a gateway 106, an electronic exchange 104, and a router 108. The client device 102 is operatively coupled with the electronic exchange 104 through one or more devices such as the gateway 106 for communication of information. Router 108 is configured to route messages between the gateway 106 and the electronic exchange 104.

The electronic exchange 104 may list one or more tradeable objects for trading. The electronic exchange 104 includes at least one processor or central computer. The electronic exchange 104 is configured to receive orders from client devices 102 and match the orders against contra orders. An order for a tradeable object that is not immediately matched may be stored and arranged in an order book for order matching according to a match algorithm for the tradeable object. The electronic trading environment may include various electronic trading environments having the same, additional or alternative features as described and illustrated with respect to FIG. 1. The exemplary embodiment of FIG. 1 represents electronic trading environments having features, such as computer programs and/or systems that do not necessarily relate to electronic trading (e.g., operating systems, gaming systems, and/or other software applications).

The electronic exchange 104 also may distribute information related to orders pending at the electronic exchange 104 and matched orders. The information may be distributed or broadcast and may include data representing a current inside market (e.g., the lowest sell price (best ask) and the highest buy price (best bid)). The information also may include all or a portion of the market depth, which may include quantities of the tradeable object available at the inside market and/or quantities of the tradeable object available at prices away from or outside of the inside market, to the extent that such quantities are available. The information also may include news, charting data, and/or order-related information from an exchange or other data source.

A quantity available at a price level may be provided in aggregate sums, where a total buy quantity and a total sell quantity available in the market at a price level is provided. The extent that the market depth is provided generally depends on the exchange and/or other parameters, such as volume. Other types of information, such as the last traded price (LTP), last traded quantity (LTQ), and order fill information also may be provided. Information related to order fills (also referred to as order execution, and order completion) may be referred to as market data.

The client device 102 may be one or more devices such as multiple work stations or a network of devices and may execute one or more applications. Examples of the client device 102 include one or more mainframe, desktop, notebook, tablet PC, handheld, personal digital assistant, Smartphone, server, gateway, combination thereof, or other computing device having one or more processors or central processing units. For example, the client device may be include a Pentium® class processor and/or may use one or more of a Windows® or MAC OS operating system, and include one or more memory or data storage devices, an data input interface for receiving data from a communications network, a user input interface for receiving input signals from one or more input devices, such as a keyboard, a trackball, pen device, microphone, gazing detection device, mouse for click-based trading and/or other device for configured to receive input from a user, and an output interface for communications with at least one output device (e.g., a monitor or display device, audio device, or combination thereof) suitable for presenting information.

The client device may receive and display the market information from one or more exchanges or other sources. For example, the display device may include a CRT-based video display, an LCD-based or a gas plasma-based flat-panel display, a display that shows three-dimensional images, audio devices, and/or Braille output devices or some other type of output device or mechanism. The display device may include an input device to provide for interaction between the user and the information.

The client device 102 may be used by a user, or a trader, to submit one or more orders for one or more tradeable objects for trading. An order may include instructions or messages to place or submit a new order, cancel an existing order, change an existing order, initiate query about orders or order book for one or more tradeable objects, test a connection to, or communication with, an exchange, combinations thereof and the like. A trader may send an order, such as by supplying one or more commands using one or more input devices associated with the client device, including a keyboard, a mouse or pointing device, a portion of the display, touching or controlling an area of the display or area controlled by the display. The client device 102 may generate transaction information in response to the user input, which may be sent to one or more exchanges.

Instructions for carrying out acts for managing hedge order for synthetic spread trading may be stored or otherwise recorded on a computer readable medium, such as non-volatile media, volatile media and transmission media, including floppy disks, flexible disks, hard disks, magnetic tape, punch cards, CD-ROM, a RAM, a PROM, an EPROM, a FLASH-EPROM, and any other memory chip or cartridge, or medium from which a computer can read. The processor may have sufficient processing capability for available market information and for carrying out the acts. In an exemplary embodiment, software may create interactive trading screens on associated display devices of the client device 102 for viewing the market information, entering and submitting orders, obtaining market quotes, and monitor positions. Additionally or alternatively, the client device may automate trading.

An example of such trading tool is available from Trading Technologies International, Inc. of Chicago, Ill. as X_TRADER®, which also provides an electronic trading interface, referred to as MD Trader®. Portions of the X_TRADER and the MD Trader style display are described in U.S. Pat. No. 6,772,132 for a "Click Based Trading With Intuitive Grid Display of Market Depth," U.S. Pat. No. 6,938,011 for a "Click Based Trading with Market Depth Display" U.S. Pat. No. 7,127,424 for a "Click Based Trading With Intuitive Grid Display of Market Depth and Price Consolidation," U.S. Pat. No. 7,389,268 for "Trading Tools For Electronic Trading," and U.S. Pat. No. 7,228,289 for "A System and Method for Trading and Displaying Market Information in an Electronic Trading Environment," U.S. Pat. No. 7,437,325 titled "System and Method for Performing Automatic Spread Trading," U.S. patent application Ser. No. 12/637,517, filed Dec. 14, 2009 and titled Synthetic Spread Trading, and U.S. patent application Ser. No. 12/637,536, filed Dec. 14, 2009 and titled Cover-OCO Orders for a Legged Order, the contents of each are incorporated fully herein by reference. In addition or alternatively, other trading tools may be used to view market data and/or to place order. Additionally, the preferred embodiments are not limited to any particular product that performs translation, storage, and display function. A system bus, or an equivalent, may provide communications.

The gateway 106 may be a computing device having one or more processors or central processing units, memory or data storage devices, communication interfaces, user input interfaces, and output interfaces. The gateway 106 may include or access a database. The gateway may execute one or more gateway applications, the gateway 106 may execute application programs of the client device 102, and/or the gateway applications may be performed by the client device 102.

The electronic trading environment may include one or more electronic exchanges 104 at which a trader may trade. The client device 102 may access the one or more electronic exchanges 104 through one or more gateway 106, and/or a combined gateway that provides access to multiple electronic exchanges. In addition or alternatively, router 108 may routes data between gateways and electronic exchanges.

II. Spread Trading

In general, a complex trading strategy involving multiple tradeable objects is referred to as a spread. Each of the tradeable objects, or orders or potential orders for each tradeable object, may be referred to as a leg or outright. An order or trade for a spread may be considered a buy or sell, where a buy defines which leg of the spread is bought—typically the first or front leg—a sell defines which leg is sold—also typically the first or front leg.

The spread may be based on a defined, or known, relationship between tradeable objects, such as a spread ratio, which indicates the quantity of each leg in relation to other legs of the spread. For example, a spread having legs A and B may be defined by a 3:2 ratio, where 3 units of leg A may be bought and 3 units of leg B are sold. The spread ratio may be implied, or implicit such that the spread ratio for a leg of a trading strategy is not be explicitly specified, but rather implied or defaulted to be "1" or "−1" (a positive nomenclature denotes bought leg and negative nomenclature denotes a sold leg).

One or more legs of the spread may also have a multiplier for a price relationship. The multiplier may be the same as or different from the spread ratio. For example, the multiplier associated with leg A may be "2" and the multiplier associated with leg B may be "−3," both of which match the corresponding spread ratio for the legs.

In an example, a trading strategy includes "N" legs, where the relationship between tradeable objects for each leg is defined according to spread ratio and multiplier associated with each leg. A strategy price, or target price, also may be determined according to the definition of the trading strategy. The price is considered the sum of price of the tradeable object multiplied by the multiplier for each of the legs, as follows:

$$\text{Strategy Price} = \Sigma_{i=1}^{N} \text{Mult}(i) * \text{Price}(i) \qquad \text{Eq. 1}$$

Where Mult(i) is the multiplier associated with leg i and Price(i) is the price for the tradeable object for leg i. One skilled in the art will also recognize that the price for a trading strategy may be affected by price tick rounding and/or pay-up ticks.

Orders for each leg may be submitted according to parameters and/or relationship defined by the trading strategy. As an example, a market for one unit of Leg A has a price of 45, and the market for Leg B has one unit at a price of 40. The current spread price, using Equation 1, would then be (1)(45)+(−1)(40)=5. Thus, a trader that buys 1 unit of the spread, buys 1 unit of Leg A at a price of 45 and sells 1 unit of Leg B at 40.

If the typical price difference is restored, such as where price of Leg A is 42 and the price of Leg B is 32, the price of the spread would be 10. If the trader sells 1 unit of the spread to close out the position (that is, sells 1 unit of Leg A and buys 1 unit of Leg B), the trader may profit on the total transaction. That is, the trader bought Leg A at 45 and sold at 42, losing 3, the trader also sold Leg B at 40 and bought at 32, for a profit of 8. Thus, the trader made 5 on the buying and selling of the spread.

Generally, a spread strategy may be based on a desired price where one or more legs are bought and/or sold at appropriate prices using an automated spread trading tool that administers trades according to the strategy. For example, a trader may enter an order to buy or sell a trading strategy at a price (also referred to as a desired strategy price, desired spread price, desired price and/or a target price), and the automated trading tool may automatically place an order (also referred to as a quoting, or working order) for at least one of the tradeable objects to achieve the price for the trading strategy.

The leg for which the order is placed is referred to as the quoting leg and the other leg is referred to as a lean leg and/or a hedge leg. The price that the quoting leg is quoted at, or working at, is based on the best price that an order could be filled at in the hedge leg, which is typically at the inside market of the hedge leg. That is, the best price is typically the best bid price of the hedge leg when selling and the best ask price of the hedge leg when buying. The best price in the hedge leg is also known as the leaned on price, lean price, or lean level. The trading strategy may be quoted in a single quoting leg or in multiple (or even all) legs of a spread where each quoted leg leans on at least one of the other legs of the spread. When one of the quoted legs is filled, the orders in the other quoted legs are typically cancelled and appropriate hedge orders are placed.

As the leaned on price changes, the price for the order in the quoting leg may also change in order to maintain the desired strategy price and/or may change according to changes in the hedge leg being within a limit, or would result in a change to the quote leg within a limit. When the quoting leg is filled, the automated trading tool may submit an order in the hedge leg to complete the strategy, also referred to as an offsetting or hedging order.

The price of a quoted leg may also or alternatively be based on less than all of other legs of a spread. The order parameters of an order in a quoted leg may lean on other types of market conditions in the other legs such as the last traded price (LTP), the last traded quantity (LTQ), a theoretical value, multiple quantities such as quantities closer to the inside market, or some other reference point.

When a quoting leg is filled, but at least one of the hedge legs cannot be filled, (or filled sufficiently to achieve the desired price of the trading strategy) the spread may be determined to be legged. The hedge leg may not be filled because the inside market for the hedge moved away before the hedge order was entered, and/or there may not be sufficient volume to fill the order at the inside market.

III. Spread Trading Tool

The orders and fills for the synthetic spread, including the orders for each leg of the synthetic spread, may be managed, compiled, recorded, viewed and the like through one or more spread trading tools, such as Autospreader®, of Trading Technologies International, Inc. A spread trading tool may be used to view market information for the spread and its legs, administer the strategy for trading the legs (outright or working orders) and/or sending orders in one or more legs.

The spread trading tool also may generate spread data based on information for its constituent legs and spread parameters. The data may be formatted and presented in a visual format, such as in a graphical user interface manager ("GUI manager"). That is, the data for the spread and/or data for one or more legs of the spread may be displayed in one or more windows for the spread and/or using the GUI. The data for the spread and the data for each leg may be displayed in the same or different windows. Orders can be entered or submitted for trading in the spread window, and the spread trading tool will submit and/or initiate submission of corresponding orders according to the spread to obtain the desired or target price of the spread.

An exemplary a spread trading tool is provided in U.S. Pat. No. 7,437,325 for "System and Method for Performing Automatic Spread Trading," U.S. patent application Ser. No. 10/804,631 for "System and Method for Estimating a Spread Value," filed Mar. 19, 2004, U.S. Pat. No. 7,389,264 for "System and Method for Performing Automatic Spread Trading," U.S. Pat. No. 7,424,450 for "System and Method for Performing Automatic Spread Trading," U.S. patent application Ser. No. 12/410,759 for "Systems and Methods for Multiplier-Adjusted Lean Levels for Trading Strategies, filed Mar. 25, 2009, all of which are incorporated fully herein by reference. Other spread trading tools may be used and the described embodiments are not limited to any particular product.

Figure 2:
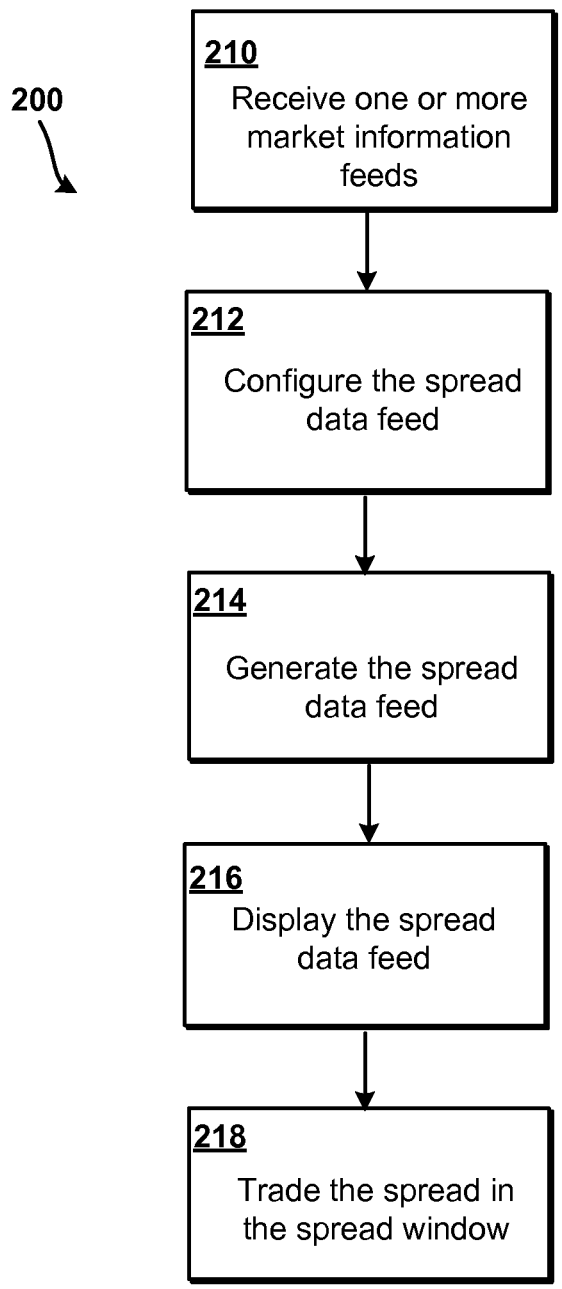
FIG. 2 illustrates a flowchart for an exemplary method for facilitating synthetic spread trading.

FIG. 2 illustrates a flowchart 200 for an exemplary method for facilitating spread trading. The method is exemplary and may include more or fewer acts, may occur an order different from that shown. In the exemplary embodiment, market information feeds are received 210 from one or more exchanges for one or more tradeable objects. The market information generally includes the price, order, and may include fill information for one or more tradeable objects the inside market for the tradeable object, including the highest bid price (HBP) and the lowest ask price (LAP), in addition to current bid and ask prices and quantities in the market at other prices, referred to as "market depth." The information may include all or some of the market depth.

The spread data also may be configured, established and/or presented 212 according to user preferences. For example, the user may customize an estimation of spread prices and spread market depth based on bids and offers from markets for the legs and the spread setting parameters. The user also may re-configure existing spreads, and/or create new spreads to configure by selecting the legs for the spread. The legs may be selected, and the spread configured, according to spread setting parameters in a configuration window. The user also or alternatively may determine a relationship between legs, order submission for a leg, and/or administration for orders for a leg.

The spread trading tool may generate the spread data 214 based on the market information and the spread setting parameters. The spread data may include spread prices and spread depth. The spread data may also include the last traded price (LTP) and/or the last traded quantity (LTQ), in addition to other items such as open, close, settlement, daily high/low, periodic high, market depth, market snapshots, and the like. The data may be included according to parameters set, identified or otherwise selected by the user, limits of the exchange from which the market data feed came, and the like. Generating a spread data may occur on a real-time basis, or substantially real-time basis, where information that is relayed from the market is presented to the user as soon as feasible.

For example, the information is processed and presented within a sufficient or reasonable amount of time to display the information. Additionally or alternatively, the spread data may be generated on a periodic time or semi-periodic time basis.

A spread window is generated and displayed 216, which also may include a window for each corresponding leg of the spread. The spread window may display a spread price and an indicator for the total quantity as well as the LTP/LTQ.

Orders for the spread, and its legs, may be entered 218 for a desired quantity at a target price in the spread window. In an example, an order is entered according to manipulating one or more input devices, such as a mouse, keyboard, light pen, combinations thereof and the like to cause an input indicator (e.g., a cursor) to position the cursor relative to the desired quantity and/or target price. The desired quantity additionally or alternatively may be preset, predefined, predetermined, or preselected.

Figure 3:
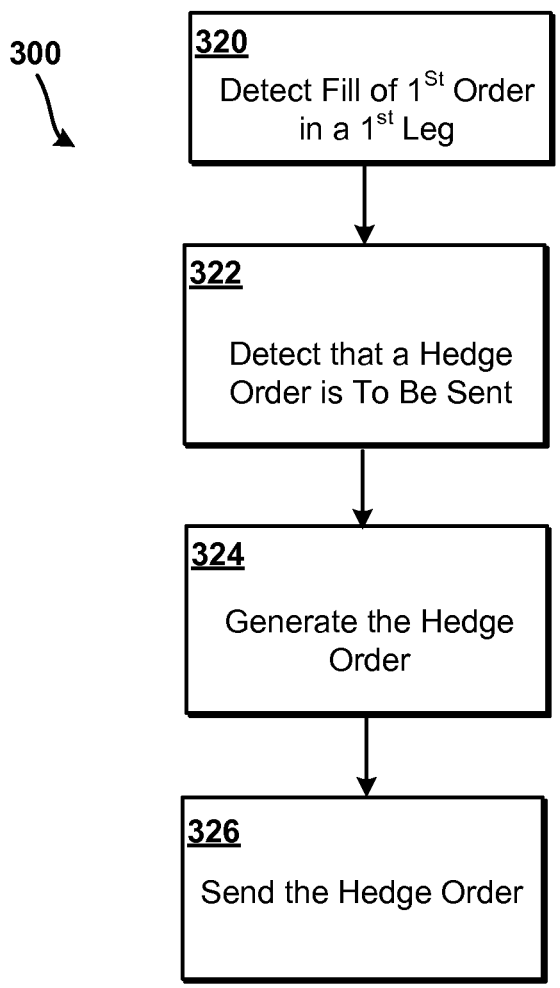
FIG. 3 illustrates a flow chart for an exemplary method for filling and executing trades for synthetic spread trading.

FIG. 3 illustrates a flow chart for an exemplary method for filling and executing synthetic spread trades. The method is exemplary and may include more or fewer acts, may occur an order different from that shown. In the example, an order for one leg is working (quoting or being quoted) at an exchange and corresponds to a first tradeable object. A complete or partial fill, match or execution, at the exchange for the quoting order is detected 320, and a hedge order is determined 322. In response to the fill of the quoting order, the hedge order is generated at 324, and is sent to the exchange for the tradeable object of the hedge order 326. The electronic exchange for the hedge order may be the same or different electronic exchange. Order parameters for the hedge order, such as a hedge order price, may be determined to achieve the spread price.

Figure 4:
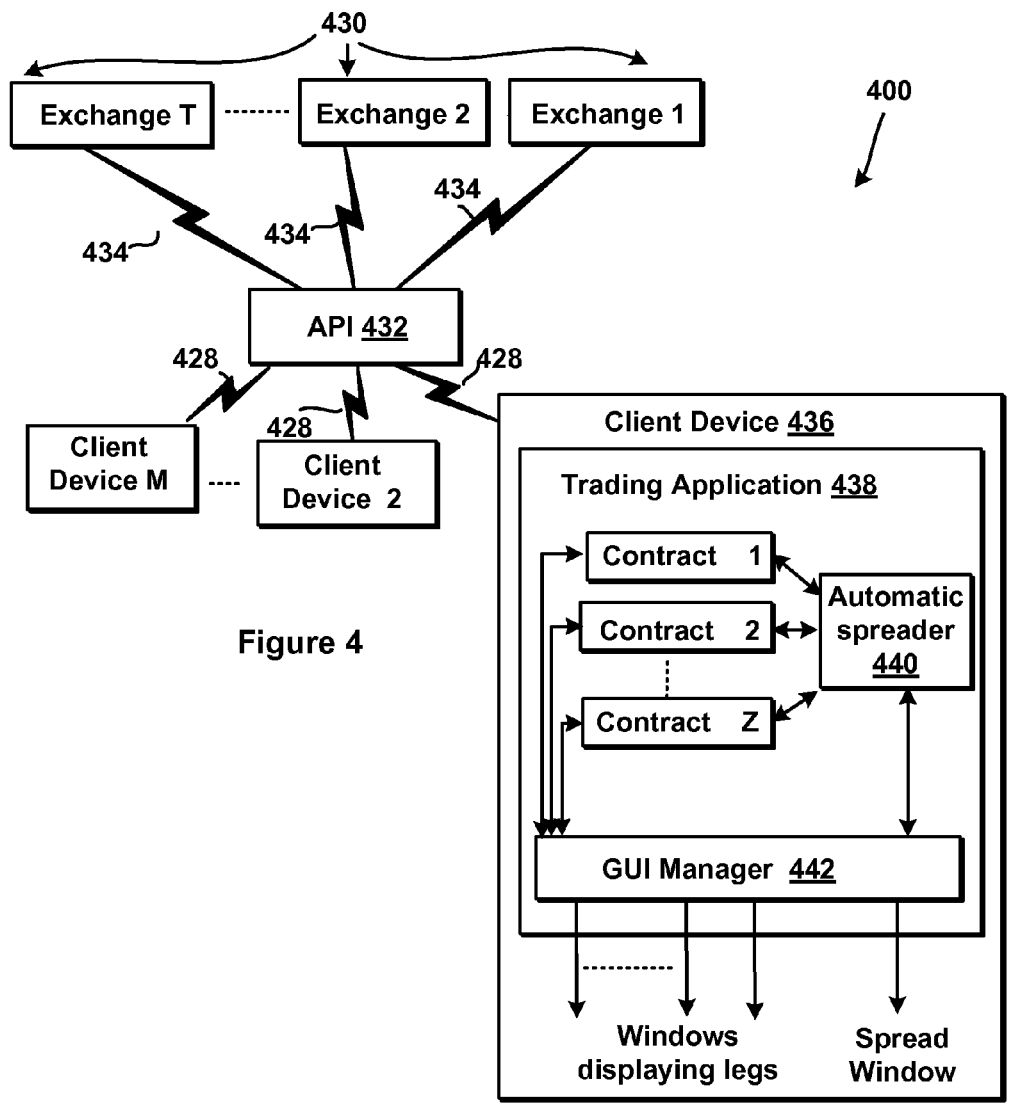
FIG. 4 illustrates a block diagram for synthetic spread trading.

FIG. 4 illustrates a block diagram for a synthetic spread trading system 400 having an applications program interface ("API") 432, exchanges 430, client devices, communications 428 between the API 432 and client devices, and communications 434 between the API 606. The communications 434, 428 may include information and data concerning tradeable objects which is generally translated by the API 432. The GUI manager 442 may be employed with an input device for receiving commands from a user. The system is generally unlimited in the number of exchanges and client devices.

Client device 436 further illustrates a more detailed block diagram having a trading application 438, an automatic spreader 440, and GUI manager 442, all or any of which may be implemented with software, hardware, or a combination thereof. Fewer or more components may be included and the trading application 438 and automatic spreader 440 may be hosted on the client device 436 or other device, may be the same software or separate software applications on the same or different client devices 436.

The automatic spreader 440 generates spread data based on market information for one or more tradeable objects and provide the information in a spread window. The spread data may include spread price and market depth and may include other items, such as the last traded price (LTP) and the last traded quantity (LTQ), high price, low price for a time or period of time and the like.

IV. Spread Trading

According to a method of managing a hedge order(s) for synthetic spread trades, a hedge order for a synthetic spread may be considered to be attached or detached to the synthetic spread from which the hedge order derived. For example, a trader of the synthetic spread may use a spread trading tool to set parameters for the synthetic spread, where one or more legs are identified as attached or detached to the synthetic spread. A hedge order that is derived from the synthetic spread order may be attached or detached to the synthetic spread order.

For example, parameters of a synthetic spread are established and a synthetic spread order is submitted, where a working order is at least partially filled or executed, and an associated hedge order derived from the synthetic spread order may be pending execution, or otherwise considered legged. The associated hedge order may have all or a portion of the original quantity of the hedge order pending or unfilled.

When the associated hedge order is designated or identified as an attached hedge order, the hedge order may be adjusted in response to adjustments to the synthetic spread order from which the pending hedge order derived. For example, a price for the associated hedge order pending execution that derives from the synthetic spread is changed in response to changes in the price for the synthetic order while the associated hedge order is pending. A hedge order that is not is attached may not be affected by changes and/or adjustments to the synthetic spread order from which the pending hedge order derived.

Figure 5:
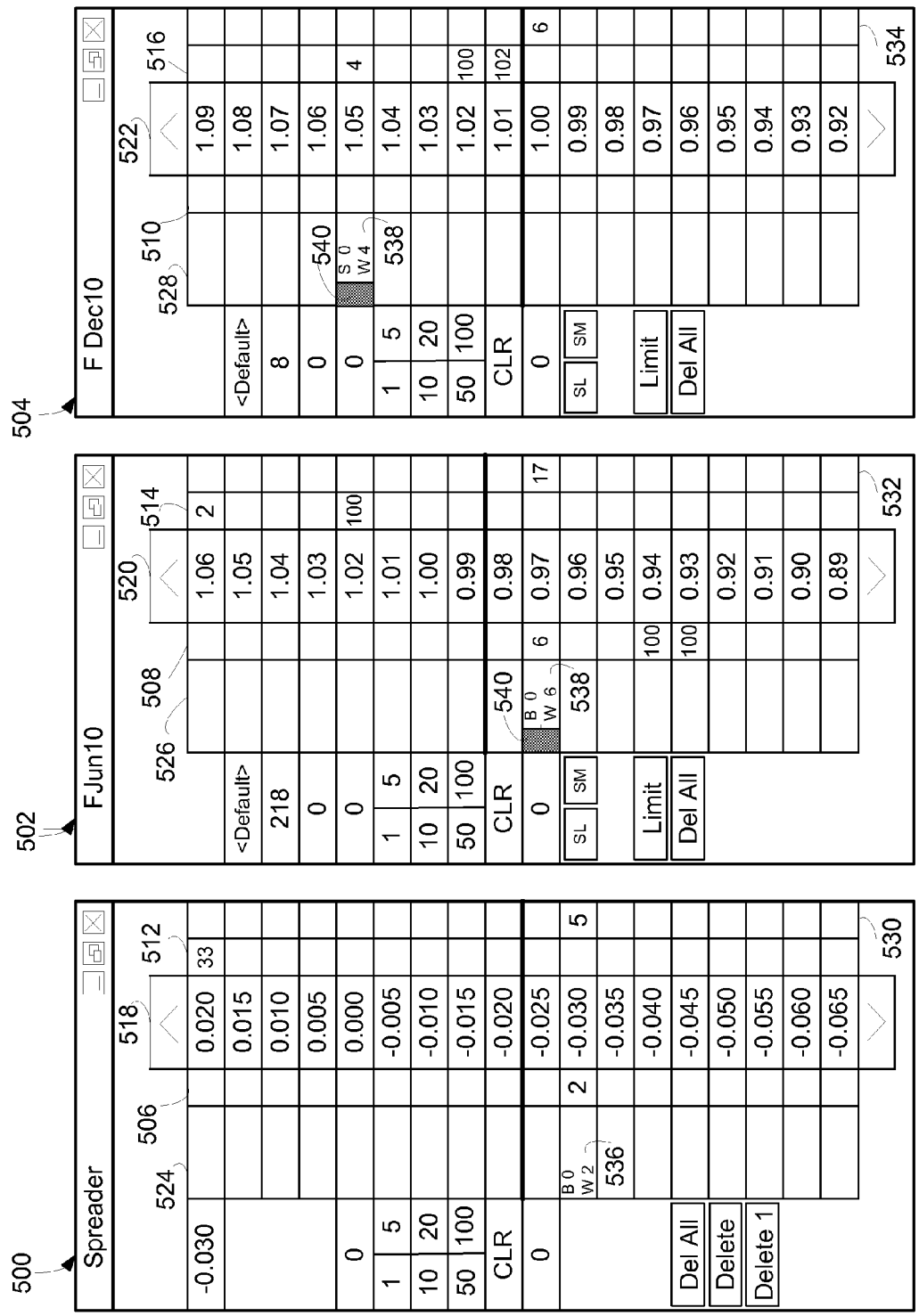
FIG. 5 illustrates a spread window display for a synthetic spread and constituent legs of the synthetic spread.

FIG. 5 illustrates an example of a spread window 500 of a spread trading tool for a spread strategy having two legs (a two-leg spread). The first leg is displayed in window 502 and the second leg is displayed in window 504. The first leg window 502 corresponds to a tradeable object for an FJUN10 contract, and the second leg window 504 corresponds to an FDEC10 contract. Though examples are discussed with respect to the spread window 500 and two leg windows 502, 504 for sake of simplicity and clarity, the number of windows displayed may depend on the number of legs in the spread and/or the user's preferences. Any number of legs of the spread may be possible. For example, a spread may have 2, 3, 4 or any number of legs, where a window is displayed for each, all, some or none of the legs of the spread.

The spread window 500 shows an inside market and market depth for the generated spread. The inside market includes the best bid, or highest bid price, and the best ask, or lowest sale price for the tradeable object. The legs windows 502, 504 also show the inside market for the respective tradeable object. The windows 500, 502, 504 include a buy order column 506, 508, 510 and a sell order column 512, 514, 516 for buy orders and the ask order for the respective spread/tradeable object.

Indicators may be displayed in the columns. The indicators may be graphic, iconic, numeric, color-coded or any form or format for representing an order. The indicators may identify one or more orders for a quantity of the tradeable object at a price. The orders may be whole or partial orders. For example, an indicator may be provided in column 506 to indicate a buy order in the market for the tradeable object of the first leg, and/or an indicator may be provided in column 514 to indicate a buy order for the second tradeable object in the market for the tradeable object of the second leg.

The windows 500, 502, and 504 have a respective price column 518, 520, 522 for identifying price levels for the respective synthetic spread/tradeable object. The price levels may be axially aligned, linearly aligned, curvilinearly aligned, or in any other alignment showing a progression of price levels for synthetic spread/tradeable object. The price levels may be static, dynamic or a combination of static and dynamic. For example, one or more of the price levels may not change position with respect to the window, may change position with respect to the window in response to an automatically generated instruction, may change position with respect to the window in response to a user instructions and/or settings, may change position with respect to the window in response to market data or changes, may change position with respect to the window in response to any combination of automatic instructions, user instructions and/or setting, market data and the like, may never change position, may drift in a display, may be displayed centered, and/or may be centered on an item of interest such as a bid, offer, last traded price and the like.

The indicators may be located along a corresponding or associated price level along price columns 518, 520, and 522 to represent or identify a price for the order corresponding to the indicator. As shown in FIG. 5, an indicator for "2" displayed in column 508 at 0.97 represents an order in the market for the for a quantity of 2 for the tradeable object of the second leg of the spread at a price of 0.97.

The displays may include additional forms for identifying market information. In an embodiment, columns 530, 532, and 534 display indicators to represent a last trade quantity and/or last traded price for the tradeable object. For example, a "17" displayed in column 532 at a price level of 0.97 represents the last traded order for a quantity of 17 at a price of 0.97 of the tradeable object of the first leg of the spread trading strategy.

The windows 500, 502, and 504 may display one or more icons or fields of interest to the user according to personal preferences, settings and/or interests. Some icons or items that are displayed or hidden by the user include a system clock that shows the current time. In addition, icons or buttons may be displayed to represent functions. The icons or buttons may be selected to perform one or more corresponding functions. For example, a Stop Market (SM) button and/or a Stop Limit (SL) button may be displayed. The button may be selected to enable stop limit and stop market orders, respectively. A "Del All" button also may be provided to delete bids and offers from the market. A "Del Bids" and/or "Del Asks" button may be selected to delete all bids/asks from the market. Instead of displaying "Bids" or "Asks," each button may include an additional indicator representing a total number of bids/asks in the market to be deleted. More or fewer buttons may be included.

V. Synthetic Spread Indicators

Columns 524, 526, and 528 provide indicators for working orders for the user. In an example, an indicator is displayed in a column 524, 526, 528 at a price level of the corresponding price column 518, 520, 522 to identify an order for quantity of the tradeable object at the price corresponding to the price level. The indicator may be any indicator, such as a status indicator that identifies one or more corresponding orders. For example, the indicator may be numerical, iconic, graphic, color coded or combinations thereof to identify the status of one or more orders.

The indicator may identify the status of all or part of the corresponding order, including how many orders are placed and/or pending, whether or how many all or part of the order is working, pending, legged, whether and/or how many orders or how much of the tradeable object is bought, sold, executed, completed, combinations thereof, and the like. For example, an indicator for a legged synthetic spread order, or a legged portion of the synthetic spread order may be numerically displayed in a red colored font to show the quantity of the synthetic spread order that is legged.

FIG. 5 shows indicator 536 illustrates an order for the synthetic spread that has been entered or otherwise submitted for trading. The indicator 536 may be positioned and/or displayed in column 524 to indicate the status of the synthetic order. As shown, indicator 536 illustrates that the order represents a quantity of 2 that is working ("W 2") to buy the spread at the price of −0.030, and that none of the order has been filled, or completed, legged or pending execution ("B 0").

An order may be entered and a resulting order submitted for trading by identifying the price and quantity. The order may be entered according to a selection of a quantity and a price along the price column 518. The order also or alternatively may be entered according to selecting a price along the price column where a quantity is preselected or predetermined. The selection of the price may occur in response to one or more clicks or other manipulation or activation of an input device to send an instruction to send at a price.

VI. Working Order Indicators

The synthetic spread trade order may have one or more working orders in one or more legs of the synthetic spread. An indicator may be displayed in a leg to identify the corresponding working order of the synthetic spread for the leg.

FIG. 5 further shows indicators 538 in each leg of the spread to identify a working order for the synthetic spread in that leg. The indicator 538 may be similar to status indicator 536 and may represent one or more orders for the corresponding tradeable object of the leg and may be iconic, graphic, numeric, combinations thereof or the like. The first leg window 702 includes an indicator 538 located at 0.97 of the price column 720, and the second leg window 504 includes an indicator at 1.05 of the price column 522. In addition, an outright order for the leg may be identified, such as by an indicator 538 or the like.

As discussed, the synthetic spread order was entered to buy a quantity of 2 at −0.030. Because the synthetic spread is defined as a 3:2 ratio, the quoting order in the first leg to buy a quantity of 6 was submitted at a price of 0.97 for the tradeable object of the first leg 502. In addition, because the synthetic spread is established to work both legs of the spread, a quoting order in the second leg for a quantity of 4 was submitted at a price of 1.05 for the tradeable object of the second leg.

The indicators also may identify whether a working is associated with a synthetic spread, such as by leg status indicators 540. For example, a leg status indicator 540 is located at 0.97 of the first leg 502 of the synthetic spread and 1.05 of the second leg 504. The synthetic spread order may be associated with the working orders of the synthetic spread, and hedge orders derived from and/or to be derived from the synthetic spread according to a parent child relationship. For example, a synthetic spread order may be considered to have one or more parent orders and the orders in each leg of the synthetic spread order may be represented by, or associated with, child orders. Child quoting orders and hedge orders may be associated with one of the parent orders and a parent order may have multiple child orders. A number of parent orders may depend on the number of legs of the synthetic spread, the number of quoting legs of the synthetic spread, user preferences, combinations thereof and the like.

Figure 6:
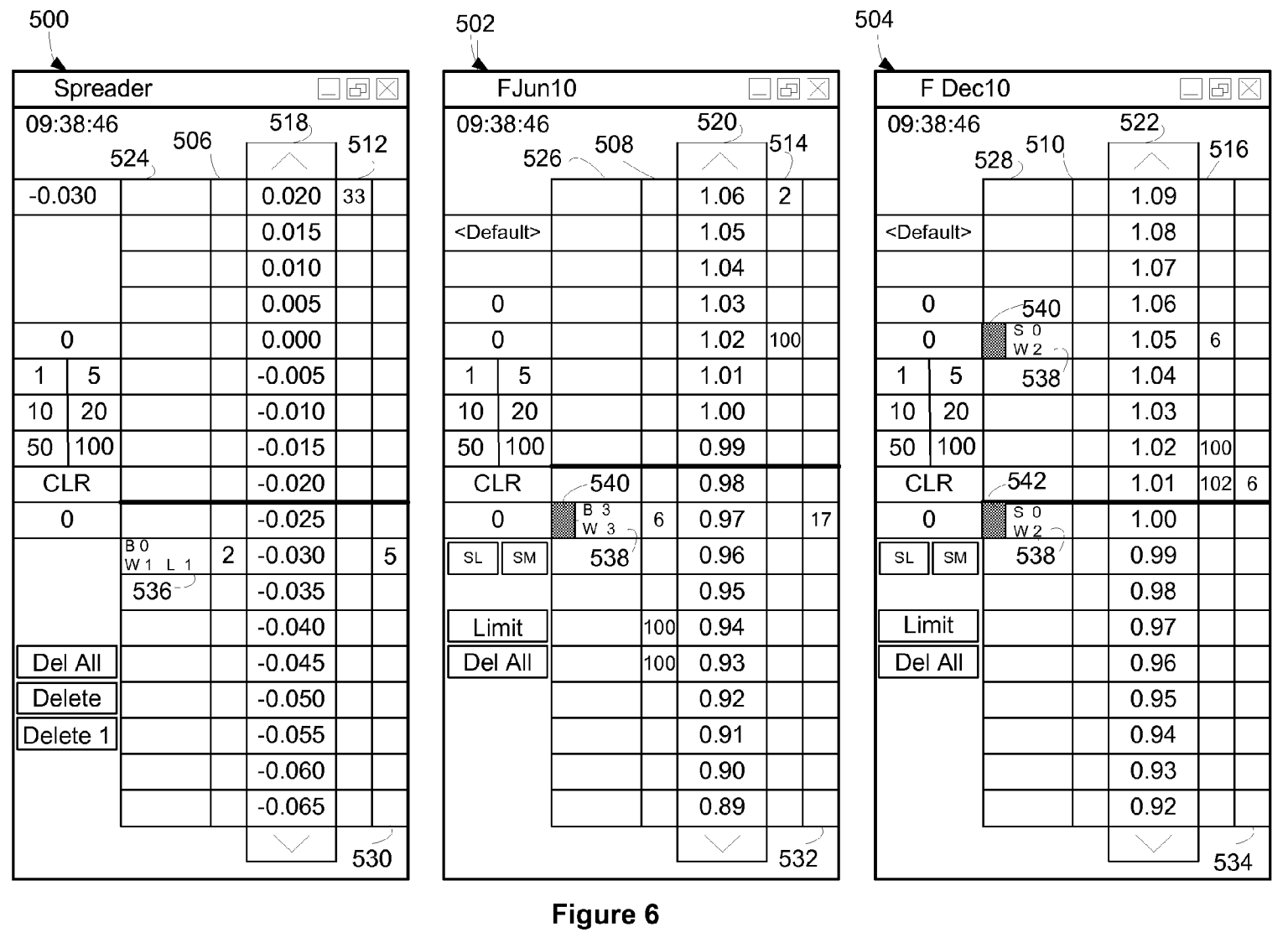

FIG. 6 shows the example of FIG. 5 after a portion of the quoting order has been filled and at least one corresponding hedge order is unfilled. In the example, a portion of the quoting order in the first leg representing three quoting orders have been filled, and a portion of a corresponding hedge order in the second leg has also been submitted and filled. In addition, because the synthetic spread was being quoted in both legs, a portion of the working orders in the second leg is not desirable, and therefore, quoting orders at 1.05 in the second leg have been deleted or cancelled. Because at least a portion of the hedge order remains unfilled, the synthetic spread order (and the trader), may be considered legged. In addition, the unfilled hedge order may be considered a legged hedge order.

Indicators 536 and 538 in FIG. 6 reflect changes to the orders over the orders identified in FIG. 7 to reflect the changes. Indicator 536 at −0.030 for the synthetic spread order reflects that one of the orders is working ("W 1"), and the other order is legged ("L 1"). Indicator 538 at 0.97 in the first leg 502 reflects that three orders are working ("W 3"), and three orders have been bought ("B 3"). Indicator 538 also has been positioned at 1.00 to represent that a hedge order derived from the synthetic order in response to at least a partial fill of the corresponding working order is working ("W 2"), or unfilled. In addition, indicator 538 at 1.05 for a working order in the second leg 504 reflects that zero orders have been sold ("S 0") and two orders are working ("W 2").

The identifier for the unfilled hedge order 538 at the price of 1.00 may identify the hedge order as being attached or detached. In an embodiment, the indicator 538 may be color-coded or include a numerical, alphabetical, and/or alphanumerical identifier showing the status of the hedge order as attached or detached. In an additional or alternative embodiment, indicator 542 may be displayed to identify the status of the hedge order as attached or detached. The indicator 542 may represent one or more hedge orders and may be iconic, graphic, numeric, combinations thereof or the like. In addition, the indicator for the order 538 and/or indicator 542 may be selected to designate all or part of the order as attached or detached.

The synthetic spread order may be managed during its lifetime, including when one or more legs of the synthetic spread may be legged or otherwise unfilled. The synthetic spread order may be maintained, adjusted, changed, managed, reported and otherwise administered during its lifetime, which generally ends when all orders of the synthetic spread have been filled, and/or deleted.

VII. Attached and Detached Hedge Orders

According to embodiments for managing hedge orders of the synthetic spread, unfilled hedge orders may also be managed according to user preferences and/or parameters of the synthetic spread from which the hedge order derived. FIG. 7 illustrates the example of FIGS. 5 and 6 after a portion of the quoting order is filled, at least one corresponding hedge order is unfilled, and a price for the synthetic spread has been changed. As shown, the price of the synthetic spread order was changed to −0.040 from −0.030. The change for the synthetic spread may be affected by moving the indicator 536 associated with the synthetic spread order, or otherwise by inputting a command to the spread trading tool to change the price of the synthetic spread order.

In response to the change of the synthetic spread order, the trading tool may identify a pending hedge order having an unfilled quantity and associated with the synthetic spread order. If the hedge order has been designated as attached, the spread trading tool may make corresponding changes to the pending hedge order. In the example of FIG. 7, because the price for the synthetic spread order has been changed to −0.040, and the corresponding working order in the first leg was filled at 0.97, the price of the pending hedge order with the unfilled quantity also may be changed or adjusted to a corresponding price. FIG. 7 show that the pending hedge order in the second leg has been changed to a price of 1.01 from 1.00 as illustrated by the corresponding indicator 538 being displayed at 1.01. The change in the price of the pending order may be affected by submitting a cancel/replace order to the exchange for the tradeable object of the hedge leg, by cancelling the hedge order and submitting a new hedge order, and/or by submitting a change message to the electronic exchange to change the price of the pending hedge order. Again, indicator 542 may be displayed to identify the status of the hedge order as attached or detached, may represent one or more hedge orders, and may be iconic, graphic, numeric, combinations thereof or the like. In an additional or alternative embodiment, the spread trading tool may not change a pending hedge order with the hedge order designated as detached. For example, with a price change for a synthetic spread order, the price of the pending hedge order with the unfilled quantity will not be adjusted or changed.

When the changed price for the pending hedge order a crosses the inside market for the hedge leg, all or a portion of the pending hedge order may be filled according to a quantity available at the inside market. For example, when the price of the pending hedge order is changed, or otherwise adjusted, from 1.00 to 1.01, and the inside market is at 1.01, or a contra order was pending at the inside market, the pending hedge order could be filled against the quantity of the contra order. Accordingly, the pending hedge order also may be filled in response to a change in the price of the synthetic spread order.

Other tools such as order book tools also may be used to illustrate synthetic spread order and the constituent orders of the spread. The tools also may be used to designate the synthetic spread, and/or any or all legs of the spread as being attached or detached. In addition, a leg of an order may be changed from attached to detached before or subsequent to a synthetic spread being entered, a working order being submitted, and/or a hedge order being submitted. Similarly, changes to a synthetic spread order that are affected using one or more tools may affect corresponding changes to hedge orders having an unfilled quantity.

A price change to a synthetic spread may be effected using a spread trading tool, such as Autospreader, that launched the synthetic spread or otherwise submitted its hedge orders. When a synthetic order has been adjusted after being submitted, such as when a price of the synthetic order is changed, a price for one or more of the corresponding hedge orders may be adjusted to reflect the price of the adjusted synthetic spread order according to the relationship between the parent orders and the child orders of the spread, a definition of the spread, and/or user preferences/settings.

A quantity for a working parent order also may be affected. The quantity may be changed according to a selection of a revised quantity using the spread trading tool, such as Autospreader, that launched the synthetic spread or otherwise submitted its child orders. The quantity may be changed within a range of values. Limits on the quantity may be determined according to one or more factors, including user preferences/settings, limits set for by an exchange, clearinghouse, or other third-party and/or limits set by a regulating body. Where a quantity of the synthetic spread order is adjusted after it is entered, a quantity for one of more of the hedge orders may also be adjusted according to a relationship, a definition of the spread and/or settings.

Additionally or alternatively, a change to a legged hedge order that has been attached may affect a change to the spread and/or working order from which the legged hedge order derived. For example, a price of a legged hedge order may be changed via a window for the legged hedge order. When the legged hedge order is attached, and a change in the price for the legged hedge order is made, a corresponding change to a working order and/or the spread order may also be affected.

VIII. Spread Configuration

FIG. 8 illustrates an example of a spread configuration window 800. The spread configuration window 800 may be used to establish or set parameters of a synthetic spread, for managing a synthetic spread and/or for managing and setting up the legs of the synthetic spread individually. The parameters include inside and outside slop configuration, pricing choices, the legs of the spread, customer account, whether to adjust a leg, offset, payup ticks, ratio for the synthetic spread, whether to check a price, whether a leg may be attached or detached and the like. The type and number of parameters to be established may vary.

A parameter may be set by entering a desired setting in a corresponding data entry area for the spread and/or leg of the spread, by selecting one or more options from a drop down menu, by selecting from an array or list of choices or radio buttons or the like. Additionally or alternatively, an order may be changed from attached to detached, and vice versa, via a spread window, a window for the legged order, a window for the working order, and/or an indicator for the spread, the working order and/or legged hedge order. In the example of FIG. 8, both legs of the spread have been identified as attached by selecting the corresponding setting 902. A description of a spread configuration window is provided in U.S. Pat. No. 7,437,325, titled "System and Method for Performing Automatic Spread Trading," which is incorporated by reference herein in its entirety.

It will be apparent to those of ordinary skill in the art that methods involved in the system and methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for synthetic spread trading, comprising:
detecting a hedge order for a hedge leg of a synthetic spread via a client device, the hedge order derived from a target price for the synthetic spread and a working order of the synthetic spread, where the hedge order includes an unfilled quantity pending execution at an electronic exchange at a hedge price;
receiving a command to change the target price for the synthetic spread to a new target price for the synthetic spread via an input device associated with the client device;
in response to receiving the command, determining a new hedge order price based on the new target price via the client device; and
submitting an update message to the electronic exchange to change the hedge price to the new hedge price via the client device.

2. The method of claim 1 where submitting the message comprises submitting a cancel/replace order to the electronic exchange.

3. The method of claim 2 where submitting the message comprises cancelling the hedge order and submitting a new hedge order for the unfilled quantity at the new hedge order price.

4. The method of claim 1 where an inside market for the hedge leg of the synthetic spread is between the hedge order price and the new hedge order price.

5. The method of claim 4, further comprising receiving, via the client device, a confirmation that at least a portion of the unfilled quantity was filled at the inside market for the hedge leg of the synthetic spread between the hedge order price and the new hedge order price.

6. The method of claim 1 where the new hedge order price is determined based on the new target price and user parameters for the synthetic spread.

7. The method of claim 1 where the hedge order is attached to the synthetic spread according to user preferences.

8. The method of claim 1 further comprising displaying, via the client device, an indicator representing the hedge order along a corresponding price level of a plurality of axially aligned price levels for the hedge leg determined according to market data for the hedge leg.

9. The method of claim 8 where the indicator illustrates whether the hedge order is attached.

10. A non-transitory computer readable medium having instructions stored thereon which when executed by a processor cause the processor to carry out acts comprising:
detecting a hedge order for a hedge leg of a synthetic spread via a client device, the hedge order derived from a target price for the synthetic spread and a working order of the synthetic spread, where the hedge order includes an unfilled quantity pending execution at an electronic exchange at a hedge price;
receiving a command to change the target price for the synthetic spread to a new target price for the synthetic spread via an input device associated with the client device;
in response to receiving the command, determining a new hedge order price based on the new target price via the client device; and
submitting an update message to the electronic exchange to change the hedge price to the new hedge price via the client device.

11. The non-transitory computer readable medium of claim 10 where submitting the message comprises submitting a cancel/replace order to the electronic exchange.

12. The non-transitory computer readable medium of claim 11 where submitting the message comprises cancelling the hedge order and submitting a new hedge order for the unfilled quantity at the new hedge order price.

13. The non-transitory computer readable medium of claim 10 where an inside market for the hedge leg of the synthetic spread is between the hedge order price and the new hedge order price.

14. The non-transitory computer readable medium of claim 13, where the acts further comprise receiving a confirmation that at least a portion of the unfilled quantity was filled at the inside market for the hedge leg of the synthetic spread between the hedge order price and the new hedge order price.

15. The non-transitory computer readable medium of claim 10 where the new hedge order price is determined based on the new target price and user parameters for the synthetic spread.

16. The non-transitory computer readable medium of claim 10 where the hedge order is attached to the synthetic spread according to user preferences.

17. The non-transitory computer readable medium of claim 10 where the acts further comprise displaying an indicator representing the hedge order along a corresponding price level of a plurality of axially aligned price levels for the hedge leg determined according to market data for the hedge leg.

18. The non-transitory computer readable medium of claim 17 where the indicator illustrates whether the hedge order is attached.

19. A spread order management apparatus, comprising:
a pending order monitor configured to detect a hedge order for a hedge leg of a synthetic spread, the hedge order derived from a target price for the synthetic spread and a working order of the synthetic spread, where the hedge order includes an unfilled quantity pending execution at an electronic exchange at a hedge price;
a user input configured to receive a command to change the target price for the synthetic spread to a new target price for the synthetic spread; and
an order manager configured to determine a new hedge order price based on the new target price in response to receiving the command and to submit an update message to the electronic exchange to change the hedge price to the new hedge order price.

* * * * *